(12) United States Patent
Zhang et al.

(10) Patent No.: US 6,219,131 B1
(45) Date of Patent: Apr. 17, 2001

(54) METHOD AND DEVICE FOR MEASURING STRESSES OF MEMBRANES IN A TRANSPARENT MATERIAL USING POLARIZATION

(75) Inventors: Jingwei Zhang, Antony; Pascal Grente, Courbevoie, both of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/337,543

(22) Filed: Jun. 22, 1999

(30) Foreign Application Priority Data

Jun. 22, 1998 (FR) .................................................. 98 07836
Sep. 24, 1998 (FR) .................................................. 98 11932

(51) Int. Cl.$^7$ ....................................................... G01B 9/02
(52) U.S. Cl. ............................................. 356/35.5; 356/491
(58) Field of Search ................................... 356/484, 491, 356/35.5, 365

(56) References Cited

U.S. PATENT DOCUMENTS 4,310,242 * 1/1982 Genco et al. ......................... 356/365
4,523,847 * 6/1985 Bjorklund et al. ................... 356/351

FOREIGN PATENT DOCUMENTS 2 563 337 10/1985 (FR) .

* cited by examiner

*Primary Examiner*—Samuel A. Turner
(74) *Attorney, Agent, or Firm*—Pennie & Edmonds LLP

(57) ABSTRACT

The device for measuring membranes comprises a light-emitting device which is arranged on one side of a transparent material (40) and which comprises a monochromatic light source (42), a fixed polarizer (44) and a photoelastic modulator (46) which gives two reference frequencies $f_0$ and $2f_0$, a scattering strip (60) placed on the other side of the transparent material, means for moving the emitted light beam (62) over the entire length of the scattering strip, and a device (64) receiving the scattered light which lies on the same side as the emitting device in relation to the transparent material and comprises an analyzer (48), an avalanche photodiode (50), two synchronous-detection amplifiers (54, 56) having as references the two frequencies which are given by the modulator, and an acquisition bench (58) for determining the phase shift of the electrical signal collected at the output of the photodiode, when stresses are exerted in relation to the case in which stresses are not exerted.

20 Claims, 8 Drawing Sheets

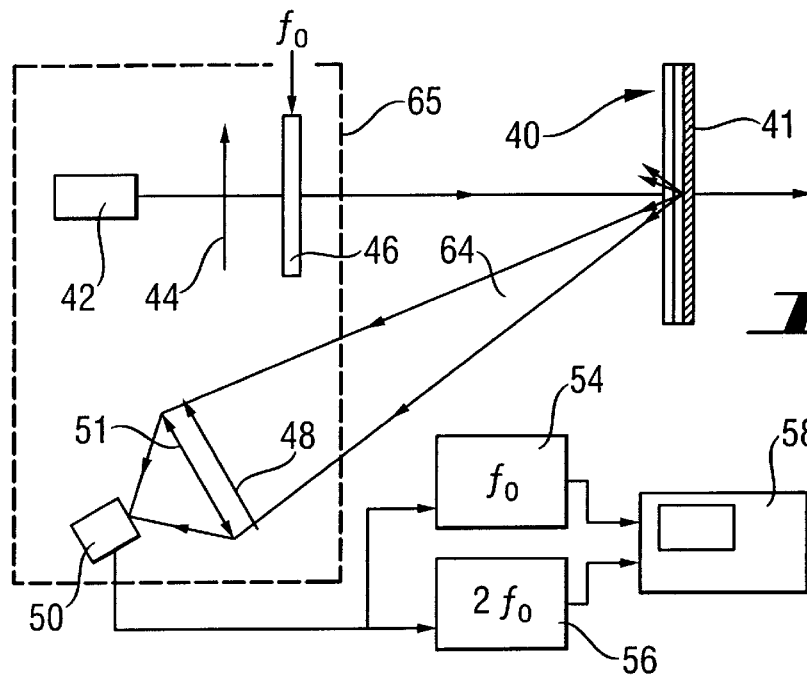
*Fig: 17*
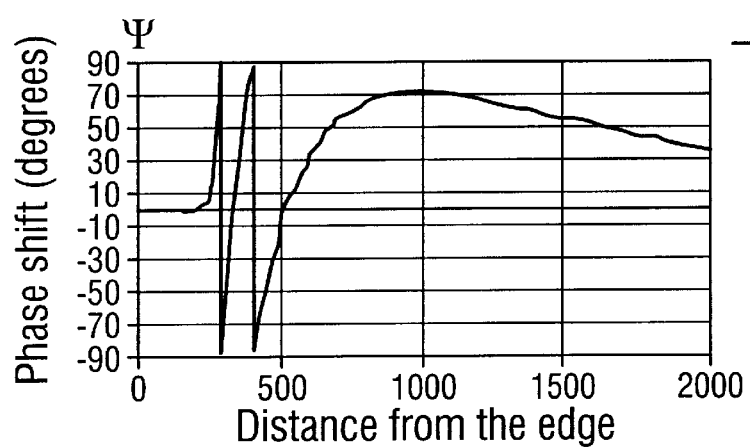
*Fig: 18*
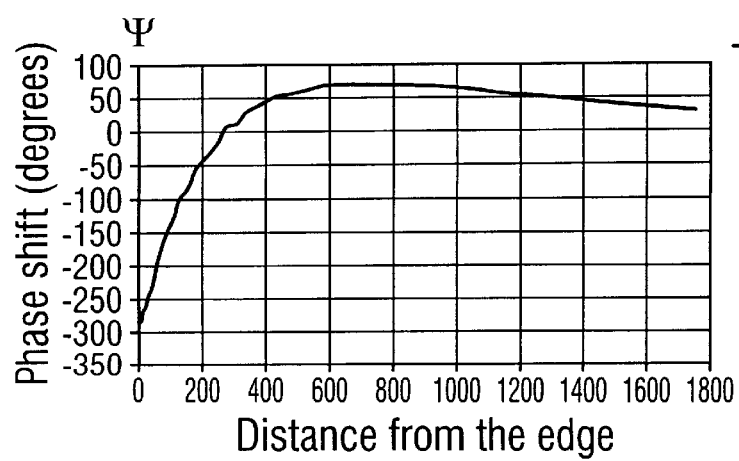
*Fig: 19*

METHOD AND DEVICE FOR MEASURING STRESSES OF MEMBRANES IN A TRANSPARENT MATERIAL USING POLARIZATION

FIELD OF THE INVENTION

The present invention relates to a method and to a device for measuring membranes within a transparent material, such as a window. Such stresses may occur, in particular, in a strip of float glass leaving the end of the production line. Incomplete control over the membranes is the main cause of breakage of glass on float glass lines. Measuring the profile of these stresses makes it possible to control them better and to improve productivity.

It is also known to create a certain prestress condition in the peripheral zone of certain windows, such as car windows, in order to give increased strength to this zone, which is generally fragile.

PRIOR ART

A device for measuring stresses in a window is known in the art, which is referred to by the term Sharples device. This device comprises a light source which emits a light beam that passes successively through a rotary polarizer, the window, a quarter-wave plate, an analyzer and a photodiode.

If the transparent material is subjected to local stresses, its refractive index is modified anisotropically, which has the effect of creating local birefringence in the material. The effect of the birefringence is to phase-shift the various polarization components of the light passing through the material.

It can be shown by the theory of photoelasticity that the stress σ existing at a point in the window is given by the formula:

$$\sigma = \frac{\lambda}{2\pi C_0 E}\Psi$$

where λ is the wavelength of the light,

E is the thickness of the window, $C_0$ is the photoelasticity constant of the window, and Ψ is the phase shift introduced by the birefringence of the window because of the existence of a stress.

Ψ is measured by rotating the analyzer until the light intensity observed at its output is zero. At this moment, a black band is observed at the place in the window where the phase shift is being measured.

The Sharples instrument is unreliable because the measurements which can be taken with it involve a not insignificant human factor and procedures which differ from one user to another. Specifically, viewing the black line depends on each individual's vision. It has thus been noted that, with the Sharples instrument, there is a large dispersion in the measurements which may be of the order of 2 MPa for a stress value of the order of 5 MPa.

U.S. Pat. No. 2 563 337, belonging to the same Applicant Company, discloses another device for measuring stress which partially overcomes the drawbacks of the Sharples device. This device, which is illustrated by appended FIG. 1, comprises a light-emitting device 10 and a light-receiving device 12 which are arranged respectively above and below a transparent material, for example a strip of glass 14 leaving the end of the production line. The strip of glass is assumed to be moving in the direction perpendicular to the plane of the page. The emitting device comprises a light source 16, an interference filter 18 for filtering the beam and transmitting a monochromatic beam of predetermined wavelength λ, an optical system 20 used to collimate the monochromatic beam, a rotating polarizer 22 driven by a motor 24 via a gear wheel 26 and a quarter-wave plate 28 oriented at 45° to the longitudinal axis of the strip of glass.

The receiving device 12 comprises an analyzer 30 oriented at 45° to the longitudinal axis of the strip of glass, an interference filter followed by a photodiode 32 and an amplifier 34.

A pyrometer 36 is installed in the vicinity of the receiving device 12 in order to measure the transverse temperature profile of the glass. The outputs of the photodiode and the pyrometer are connected to a microprocessor 38.

The phase shift Ψ is measured by an optical encoder and is stored in the microprocessor. It is therefore possible, using formula (1), to calculate the stress σ at any point in the strip of glass.

The emitting device 10 and the receiving device 12 are mounted on two support arms lying respectively above and below the strip of glass, and move with a to-and-fro movement on these support arms, along guide rails oriented in the transverse direction of the strip of glass. The movement of the two devices must be synchronous so that their optical axes are always in mutual alignment.

The device according to the said patent makes it possible to measure the stresses correctly, but has several drawbacks:

it has a high cost because of the use of two support arms which need to be driven synchronously, the rotational drive of the optical system formed by the polarizer and the encoder is provided by relatively complicated mechanical transmissions which require continual maintenance, the frequency of the signal, which is of the order of a few hertz, is too small for an accurate measurement of the phase shift Ψ to be made, because at this frequency the light intensity fluctuates with the slightest of perturbations, such as dust, inclusions or irregularities in the layers deposited on the glass.

The object of the present invention is to overcome these drawbacks by providing a method and a device for measuring stresses which perform well and make it possible to simplify the mechanics for translating the units, or even eliminate this completely, so as to reduce the cost involved.

It also relates to a method and to a device for measuring stresses which are not sensitive to fluctuations in intensity due to dust, inclusions in the glass and irregularities in the layers deposited on the glass.

It also relates to a method and to a device for measuring stresses which make it possible to take proper measurements even if the signal is weak in relation to the noise.

In order to describe the invention, the principle on which it is based will be described first.

A birefringent medium will be considered which is subjected to a stress and is placed between a polarizer and an analyzer. It is known that this introduces a phase shift $\Psi_0$ and that the light intensity I measured at the output of the analyzer is a maximum if the polarizer and the analyzer are crossed and are at 45° with respect to the characteristic axes of the birefringent medium. This intensity is given by the formula:

$$I = \frac{I_0}{2}(1 + C\cos\Psi_0)$$

where C is the contrast and $I_0$ is the transmitted light intensity.

The phase shift $\Psi_0$ may be the sum of several phase shifts introduced by different optical components. If one of these components is a modulator, for example of the photoelastic type, whose characteristic axes coincide with those of the strip of glass, the following condition will be obtained:

$$\Psi_0 = \Psi + \Psi_m$$

where $\Psi$ is the phase shift to be measured in the strip of glass, $\Psi_0$ is the phase shift introduced by the modulator.

Using $f_0$ to denote the excitation frequency of the modulator, this gives $\Psi_m = A_0 \cos(2\pi f_0 t)$.

The measured intensity is then:

$$I = \frac{I_0}{2}\{1 + C\cos[\Psi + A_0 \cdot \cos(2\pi f_0 t)]\}$$

Rearranging the expression above gives:

$$\frac{2I}{I_0} - 1 = C.\cos\psi \cos[A_0\cos(2\pi f_0 t)] - C.\sin\psi \sin[A_0\cos(2\pi f_0 t)]$$

The amplitudes of the components of I at frequencies $f_0$ and $2f_0$ are respectively given by:

$$B(f_0) = -CI_0 J_1(A_0) \cdot \sin\Psi$$

$$B(2f_0) = -CI_0 J_2(A_0) \cdot \cos\Psi$$

where $J_N$ are the $N^{th}$ order Bessel functions.

However, these two components do not make it possible to calculate the phase shift $\Psi$ because, in view of practical measurement conditions, the contrast C is equal to an unknown value less than 100%. Similarly, $I_0$ is unknown given that the absorption by the glass varies from one component to another and that dust, inclusions in the glass and surface irregularities cause a rapid variation in $I_0$.

These difficulties are overcome by calculating the ratio:

$$\frac{B(f_0)}{B(2f_0)} = \frac{J_1(A_0)}{J_2(A_0)} \cdot \tan\psi$$

which can be rearranged to give:

$$\psi = \operatorname{Arctan}\frac{J_2(A_0)B(f_0)}{J_1(A_0)B(2f_0)}$$

Knowing the two components at $f_0$ and $2f_0$ of the signal makes it possible to deduce the value of the phase shift $\Psi$ and therefore the stress $\sigma$. This argument applies, of course, for any component $2n \cdot f_0$ and $(2n+1) \cdot f_0$, since this only changes the value of the Bessel coefficients in the final equation.

The principle set out above is very general and applies both in transmission and in reflection.

The invention uses this principle with a view to simplifying the translation mechanics of the device and to improve the performance of the measurements.

SUMMARY OF THE INVENTION

The present invention relates to a method for measuring stresses.

The method according to the invention can be applied to a transparent material which itself has a movement imparted to it. This is the case, for example, with a strip of float glass leaving a glass production line. The entire surface of the material can then be scanned by giving the light beam an oscillating movement of amplitude at least equal to the dimension of the material which is perpendicular to its direction of motion.

According to a variant of the method of the invention, the light which has passed through the transparent material is reflected using a scattering and/or reflecting strip arranged on the other side of the transparent material in relation to the light-emitting device, and the light-receiving device is placed on the same side as the light-emitting device in order to receive the said reflected light.

Advantageously, the light-emitting device and the light-receiving device may then be made integral with one another, be arranged at a fixed point and have oscillating movements imparted to them. By virtue of this embodiment, the measurement device does not have a support arm for holding the emission and reception devices.

The method of the invention can also be applied to a transparent material coated on one of its faces with a opaque layer, as is the case with car windows which are covered on their periphery with a very darkly coloured enamel layer. The light beam emerging from the emitting device enters the transparent material through the face on the opposite side from the one coated with the opaque layer. On reaching the latter, the light is scattered in all directions, some of the scattered light passing through the opaque layer and some being reflected. The light-receiving device may be arranged either on the same side as the opaque layer, so as to receive the scattered light transmitted through the transparent material, or on the opposite side from the opaque layer so as to receive the light reflected by it.

The invention also relates to a device for measuring stresses.

The device according to the invention does not have any of the drawbacks of the devices in the prior art. In particular, the device has a very simple design because it does not include a support arm.

Furthermore, using the photoelastic modulator makes it possible to keep the polarizer fixed. This results in a simplification of the mechanical system.

The device according to the invention is moreover easy to control. Although the maximum light intensity can be obtained only by crossing the polarizer and the analyzer and by placing them at 45° with respect to the characteristic axes of the transparent material, this condition is not absolutely necessary in the case of the invention. In other words, the contrast C does not necessarily have to be equal to 100% since, as explained above, the ratio $B(f_0)/B(2f_0)$ does not depend on the contrast.

For the same reason, the device is not sensitive to the problems of fluctuation in the light intensity $I_0$ which are caused by dust, inclusions and irregularity of the layers. Furthermore, with the relatively high modulation frequency, which is 50 kHz, the measurement speed is so fast that, during the measurement, the variation in the light intensity $I_0$ is negligible.

Although a scatterer partially depolarizes the light, and consequently makes the contrast even weaker in an unpredictable way, the measurement is still reliable for the same reason as above.

Another advantage resides in the fact that using synchronous detection to measure the amplitudes of the light intensity at $f_0$ and $2f_0$ makes the device very robust in terms of noise. It makes it possible to take proper measurements even if the signal is weak in relation to the noise.

Lastly, the method and the device according to the invention make it possible to plot the stress profile over the entire width of the transparent material.

BRIEF DESCRIPTION OF THE DRAWINGS

The invention will be understood more clearly on reading the following description which is given with reference to the appended drawings, in which:

FIG. 17 represents another embodiment of the device for measuring stress in the said zone, in which the measurements are taken by reflection/scattering;

FIG. 18 and 19 are curves of variation of the phase shift which are respectively similar to FIGS. 14 and 15 and are obtained with the device in FIG. 17;

DETAILED DESCRIPTION OF PREFERRED EMBODIMENTS

The description below will be made with reference to the particular case of a strip of float glass leaving a production line, but it applies equally to any kind of transparent material.

Figure 1:
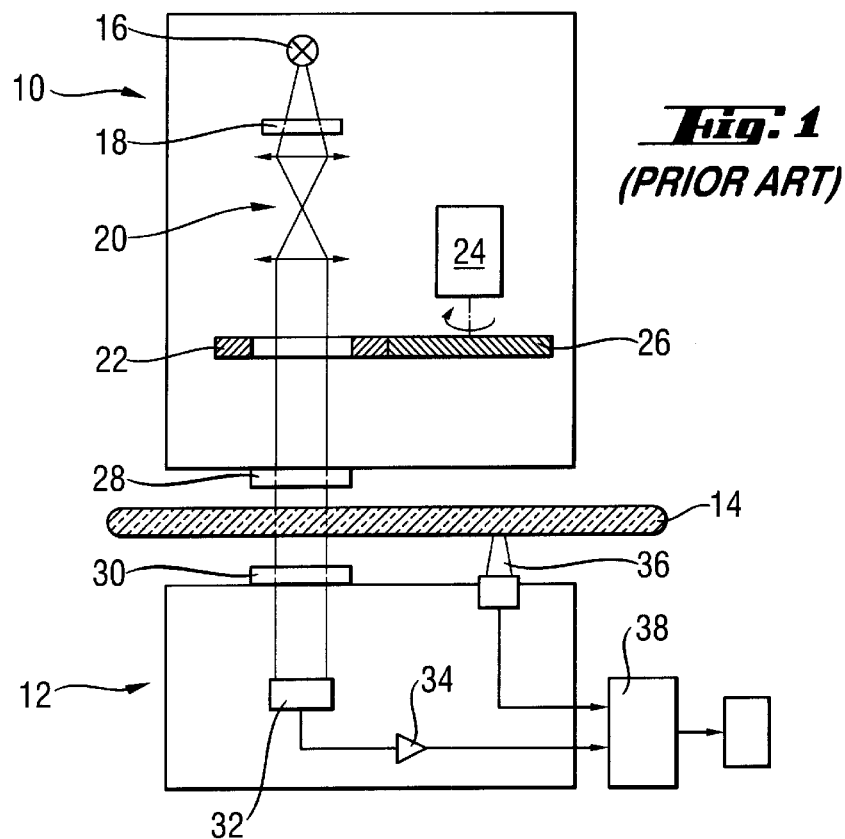
FIG. 1 is a schematic view of a device for measuring stresses according to the prior art.
Figure 2:
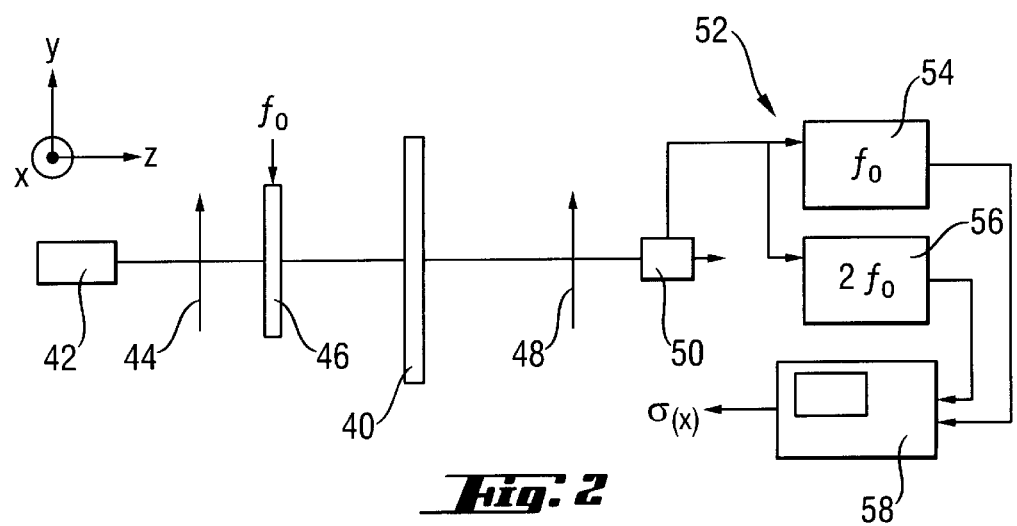
FIG. 2 is a schematic view of a device for measuring stresses which is laid out for transmission and is based on the principle of the invention, the transparent material consisting of a reference specimen.

Since FIG. 1 has already been described, the description will pass directly to FIG. 2 which represents a device for measuring stresses by transmission, which incorporates a photoelastic modulator and a synchronous-detection device and which will be used to validate the method for measuring stresses by scattering of the invention.

The principle of the validation is as follows: instead of the strip of glass, prestressed glass reference specimens 40 are used whose stress profiles are fully known. These reference specimens are obtained by volumes of glass which are annealed in order to obtain a stress profile similar to that of the strip of glass leaving the end of the production line.

Each of these reference specimens is put in turn in the measurement device in FIG. 2. This device makes it possible to determine the stress profile of each of the reference specimens experimentally. If the profile found by the measurement is the same as the known profile of the reference specimen, it can be concluded that the method of the invention is validated.

FIG. 2 represents a coordinate system Oxyz whose axes Ox, Oy and Oz are respectively parallel to the longitudinal and transverse directions and normal to the plane of the reference specimen 40.

The device in FIG. 2 comprises a monochromatic light source 42, for example a 2 mW ($\lambda$=632.8 nm) helium-neon laser. The light passes successively through a polarizer 44 oriented at 45° to the Oy axis, a photoelastic modulator 46 which is oriented so that its axes coincide with the Ox and Oy axes, the glass reference specimen 40 with known stress profile, the stress direction being parallel to the Oy axis, an analyzer 48 oriented at −45° to the Oy axis and a photodiode 50 which converts the light into an electrical signal.

Figure 3:
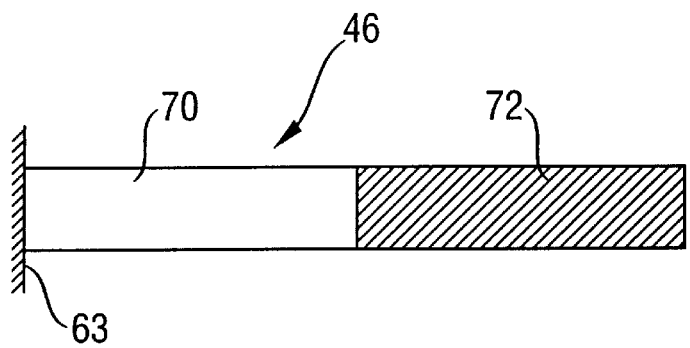
FIG. 3 is a schematic sectional view of a photoelastic modulator.
Figure 4:
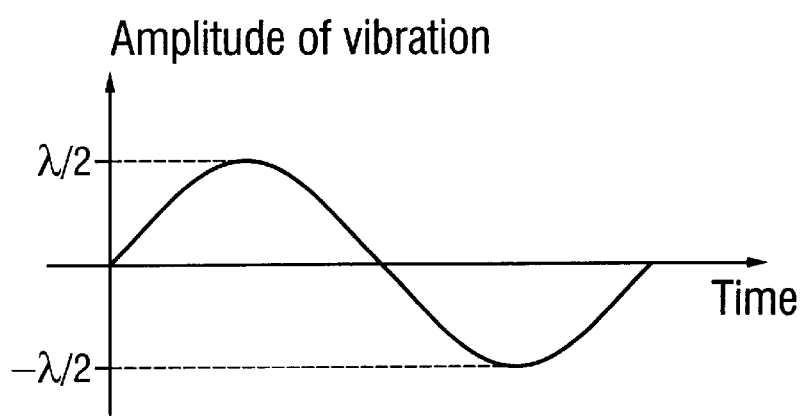
FIG. 4 represents the modulation cycle of the photoelastic modulator.

The structure and mode of operation of a photoelastic modulator will be summarized with reference to FIGS. 3 and 4.

The photoelastic modulator 46 consists of a bar of a transparent material 70, for example made of silica, one of whose ends is adhesively bonded to a piezoelectric crystal 72 and whose other end bears on a mechanical stop 63.

The modulator is a resonant instrument which produces an oscillating birefringence at a fixed frequency. In the present case, the frequency is 50 kHz.

The piezoelectric crystal is excited at the resonant frequency of the transparent bar 60 and is driven by an electronic circuit which controls the amplitude of the oscillations. It is the amplitude of the oscillations which determines the modulation cycle of the state of polarization of the light emerging from the modulator. A working amplitude $A_0 = \pi$ will be used below.

FIG. 4 represents the variation in the amplitude of vibration with time for a 45° polarization state of the modulator.

Returning to FIG. 2, the signal leaving the photodiode is sent to a synchronous-detection device 52 comprising two synchronous-detection amplifiers 54, 56 whose references are given by the photoelastic modulator 46. These references may be chosen to be equal to $f_0$ and $2f_0$, for example 50 kHz and 100 kHz. Two analogue signals $B(\omega_0)$ and $B(2\omega_0)$ corresponding to the spectral components at $f_0$ (50 kHz) and $2f_0$ (100 kHz) of the signal measured by the photodiode are recovered at the output of the amplifiers 54 and 56.

These two analogue signals are converted into digital form by a computer 58 which determines the value of the phase shift Ψ by using the expression (2) mentioned above, and consequently the stress. The plot of the stress profile of the glass reference specimen is thus directly obtained.

In a particular illustrative embodiment, two reference specimens are used, one having a stress at the centre of 3.25 MPa and the other 3.9 MPa, and having substantially parabolic profiles.

For $A_0=\pi$, $J_1(A_0)=0.2846$ and $J_2(A_0)=0.4854$.

Substituting these values into expression (2) gives:

$$\psi = \text{Arctan}\left[1.706 \frac{B(f_0)}{B(2f_0)}\right] = \frac{2\pi}{\lambda_{(nm)}} C_0 \sigma E_{(nm)} \cdot 10^6$$

where $C_0 = 2.6 \; 10^{-6}$ MPa$^{-1}$

Figure 5:
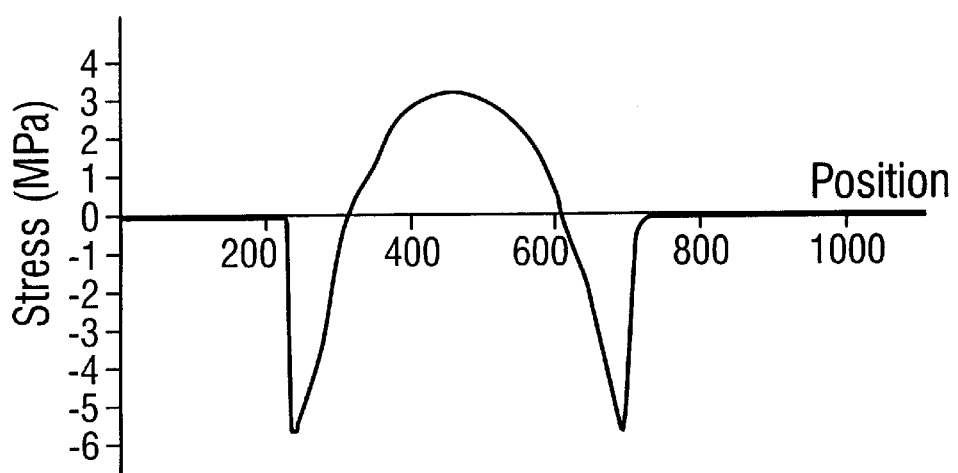
FIG. 5 shows a stress profile obtained with the device in FIG. 2 on a reference specimen of transparent material.

FIG. 5 shows the stress profile thus obtained. It can be seen that this profile corresponds perfectly to the profile measured by the prior art for the reference specimen, since in FIG. 5 a maximum of 3.20 MPa is found whereas, as indicated above, the value measured manually is 3.25 MPa.

This experiment was repeated with several prestressed glass reference specimens, and the values obtained by the method of the invention were in each case equal to those measured manually.

The method of the invention is therefore validated in the transmission configuration.

The application of this method to the device for measuring stress by scattering according to the invention will now be described.

Figure 6:
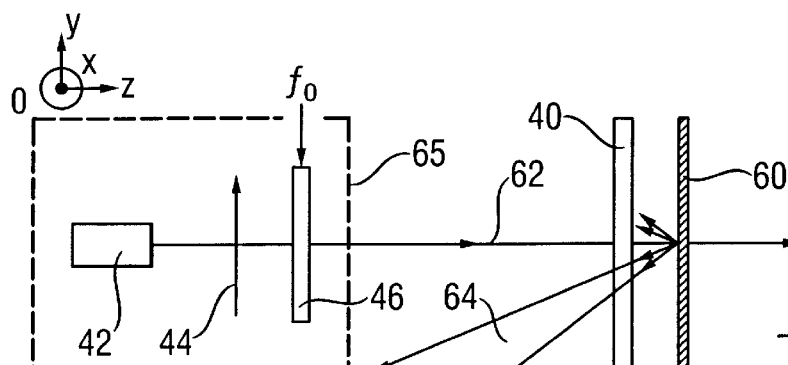
FIG. 6 is a schematic view of a device for measuring stresses laid out for scattering according to a first embodiment of the invention, using a single support arm.

A first embodiment of this device is represented in FIG. 6. In this figure, the elements similar to those in FIG. 2 are designated by the same references. The device in FIG. 6 differs from the one in FIG. 2 by the fact that:

the emission device (which comprises the laser 42, the polarizer 44 and the modulator 46) and the reception device (which comprises the analyzer 48 and the detector 50) are placed on the same side as the glass 40 to be measured;

it comprises a band 60 of reflecting or scattering material which is arranged on the other side of the strip of glass and which can reflect at least a part of the incident beam 62 which it receives, to the reception device in the form of a scattered beam 64;

the photodiode is replaced by an avalanche photodiode, which is more sensitive, since the scattered flux 64 is weaker than the transmitted flux 62.

It will be noted that another significant difference in relation to the case of transmission resides in the fact that the light passes through the glass twice before being detected. By choosing a small angle between the emission axis and the reception axis, the stress is measured twice, which doubles the sensitivity of the measurement.

The emission device and the reception device are combined in the same unit 65, which is mounted so as to slide on a monorail support arm (not shown). The rail is arranged transversely in relation to the direction in which the strip of glass 40 moves, so that during the return journeys of the unit, the emitted light beam 62 runs through the strip of glass over its entire width.

The band 60 is arranged transversely in relation to the strip of glass, preferably in the vertical plane which contains the rail and which is perpendicular to the strip of glass. The band will preferably be made of a reflectorized signalling material or of anodized white metal.

Figure 7:
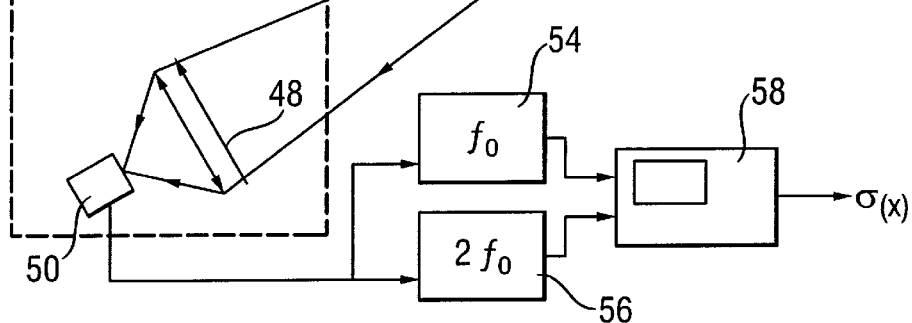
FIG. 7 shows a stress profile obtained with the device in FIG. 6 on a reference specimen of transparent material.

An example of a measurement on a reference specimen is represented in FIG. 7. A maximum stress $\sigma_m=7.80$ MPa is measured at the centre of the plate, while the value given is 3.9 MPa, which is indeed half the measured value.

The discontinuity at the end of the profile should be noted. This discontinuity is due to the fact that the measured phase shift exceeds 90°, because the sensitivity of the measurement is doubled. The result of this is that the expression (2) which makes it possible to determine the stress gives a result having an offset by a period of 180° in the arctangent. This discontinuity is moreover easy to correct numerically.

The profile thus obtained is in full agreement with that measured manually. The scattering layout is therefore itself also validated. This layout is advantageous because it makes it possible to use only a single support arm.

Figure 8:
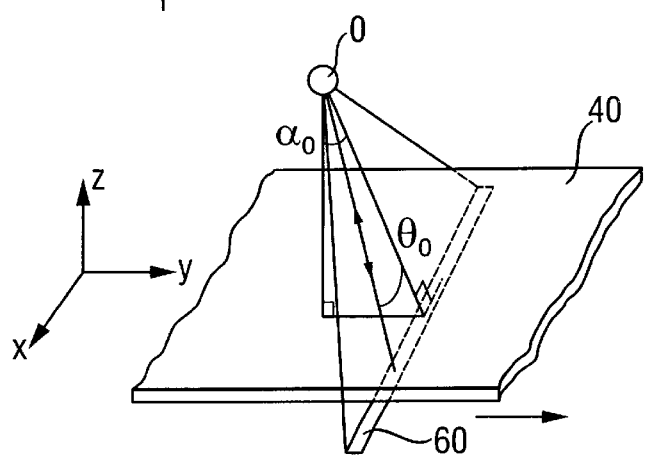
FIG. 8 is a schematic view of a device for measuring stresses, also laid out for scattering, but not using a support arm.

Reference will now be made to FIG. 8, which represents a second embodiment of the device for measuring stress by scattering.

As in the previous embodiment, the emission device and the reception device are fitted side by side in a unit schematically represented by the point 0. The unit is mounted in a fixed position above the strip of glass 40.

The emission and reception system rotates about the fixed point 0 so that the laser beam angularly scans the entire width of the strip of glass. The scanning angle $\theta_0$ varies between −45° and +45°. The light is reflected by a band of scattering material 60 fixed on a transverse support arranged under the strip of glass.

As shown by FIG. 8, the emission-reception system does not lie on the vertical to the strip of glass, but is offset angularly rearwards in relation to this vertical by an angle $\alpha_0$, in order to prevent specular reflection from returning a beam reflected by the glass when the laser beam is incident on the strip perpendicularly ($\theta_0=0$).

The explanation for this is as follows. During the angular scanning, the detector always receives a fairly stable light intensity. If, however, the beam reflected by specular reflection is picked up, an abrupt increase in the light intensity will be observed, which may saturate the detector. Furthermore, specular reflection thus contains information about the interference between the reflections from the two faces of the strip of glass, which invalidates the theory presented above. In practice, $\alpha_0$ is set to a small value of 5°.

The configuration in FIG. 8 is even simpler and even more economical than that in FIG. 6, since it does not have any support arm. Furthermore, because the emission-reception system can be placed far above the strip of glass, it is possible to install a cooling system. This provides the possibility of taking a measurement of stresses when hot.

However, the results given on the device in FIG. 8 require a correction, because the fact that the strip of glass is angularly scanned means that the angle of incidence of the laser beam on the glass is variable and the thickness of the glass through which it passes is also variable. Expression (5) in which the thickness E is assumed to be constant cannot therefore be applied.

It can be shown that the effective stresses $\sigma'_i$ measured at a fixed point when the angle of incidence on the glass varies are connected with the stresses $\sigma_i$ to be measured by the following equations:

$$\sigma'_1 = \sigma_1(\cos^2\theta'_0 - \sin^2\alpha'_0 \sin^2\theta'_0)$$

$$\sigma'_2 = \sigma_2 \cos^2\alpha'_0$$

where $\alpha'_0$ and $\theta'_0$ are two angles defined in the glass such that $n \sin\alpha'_0 = \sin\alpha_0$ and $n \sin\theta'_0 = \sin\theta_0$ where n is the refractive index of the glass.

In the specific case of the invention, $\sigma_1=0$ and $\alpha'_0$ is very small. The result of this is $\sigma'_2 \approx \sigma_2$. The effective thickness is then $E_e = E/\cos\theta'_0$. Finally, the phase shift $\Psi$ is given by the formula:

$$\psi = \frac{2\pi}{\lambda}\sigma'_2 2E_e = \frac{4\pi}{\lambda}\sigma_s \frac{E}{\cos\theta'_0}$$

Figure 9:
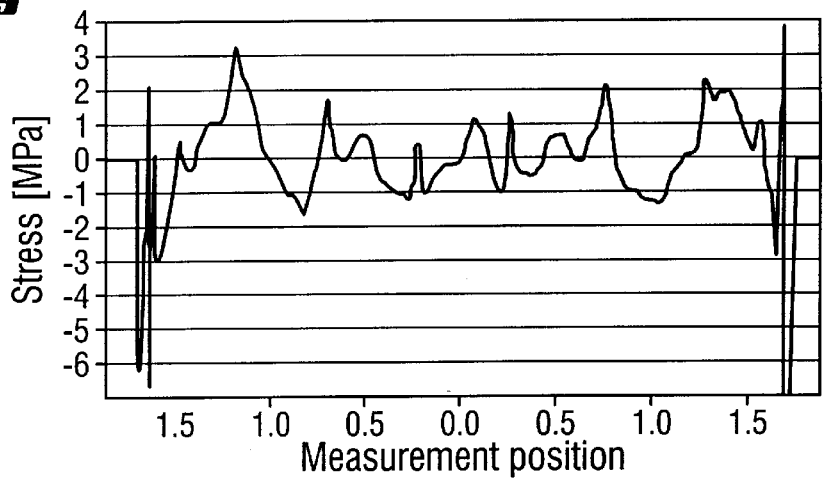
FIGS. 9, 10 and 11 respectively show stress curves obtained with the devices in FIGS. 1, 6 and 8 on a strip of float glass.
Figure 10:
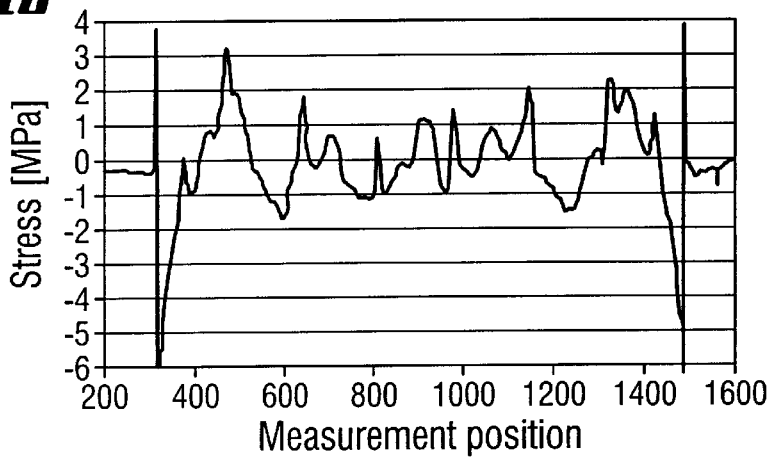

FIG. 9 shows the curve of variation of the stresses on a float glass production line in the case of a prior device, and FIG. 10 shows the curve in the case of a device for measurement by scattering, with a single support arm. The very good agreement between the results obtained by the two measurement systems should be noted.

Figure 11:
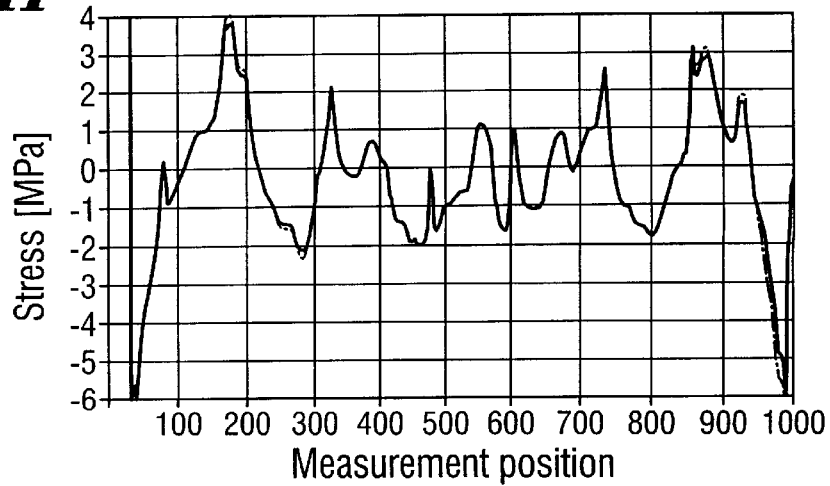

Lastly, FIG. 11 represents the curve of variation of the stresses in the case of a device for measurement by scattering, without a support arm, the curve in dashes being the raw curve and the solid curve being the curve corrected in order to take account of the variation in the angle of incidence.

The method for measuring stresses according to the invention can be applied for taking measurements on special glasses, such as printed glass which has large geometrical deformations and high-absorption glass.

By virtue of its high measurement speed, the measurement device according to the invention can take correct measurements on printed glass, because the measurement time is so short that, over this period, the deformation of the glass cannot significantly perturb the signal.

Furthermore, the device according to the invention is very robust in terms of electronic noise. The signal processing makes it possible to detect the measurement even when the signal/noise ratio is small. The device therefore makes it possible to work with very high-absorption glasses.

The method according to the invention can also be applied to the measurement of stresses in a transparent material covered on one of its faces with a layer of opaque material. This is the case, for example, with certain car windows, such as windscreens which are covered on their periphery with a layer of very darkly coloured enamel in order to protect the adhesive which is needed for fitting the window against the action of ultraviolet rays and also in order to conceal jointing defects.

It is known to create a certain state of prestress in the peripheral edge zone of these windows in order to give increased strength to this zone, which is generally fragile. The consequence of this is to generate compressive stresses in the edge zone and in compensation, tensile stresses on a band which is a few centimetres wide and is on the inside in relation to this zone. This phenomenon is illustrated by appended FIG. 12, which represents the curve of variation of the stress as a function of the distance from the edge. The compressive zone has a width 1 and the tensile zone has a width L.

The method and the measurement devices described above can be used for measuring stresses over the entire width of the peripheral edge of the window.

Figure 13:
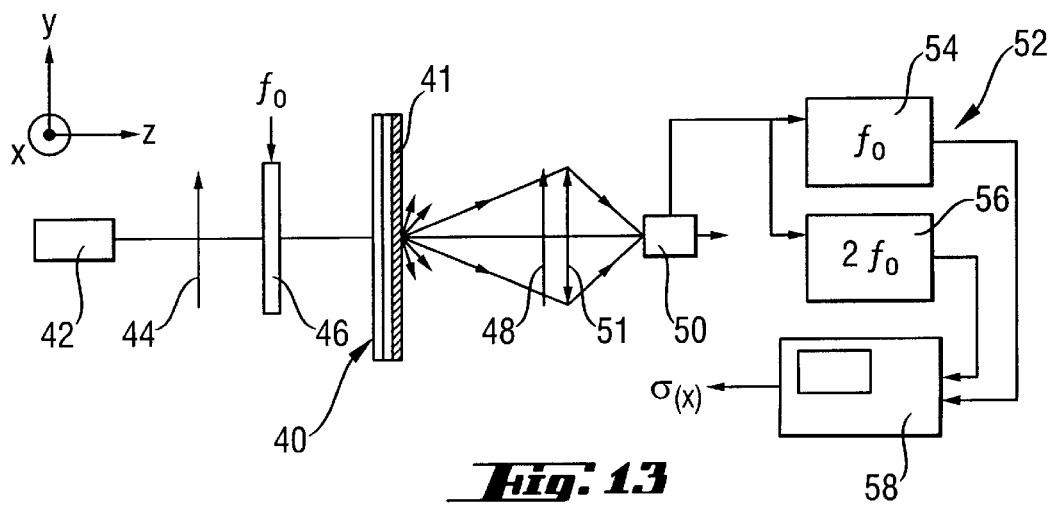
FIG. 13 represents a device for measuring stresses in the said zone, the measurements being taken by transmission/scattering.

FIG. 13 represents the device for measurement by transmission in FIG. 2, which is adapted in order to measure the stresses in a window covered with an opaque layer 41. The elements of this device which are identical to the ones in FIG. 2 have been designated by the same numerical references. This device will not be described, and it will merely be pointed out that the light-emitting device is arranged on the opposite side from the face of the window which is covered with the opaque layer 41 and that, in order to increase the sensitivity of the device, use is made of a converging lens 51 and, as the photodiode, an avalanche photodiode 50.

Figure 14:
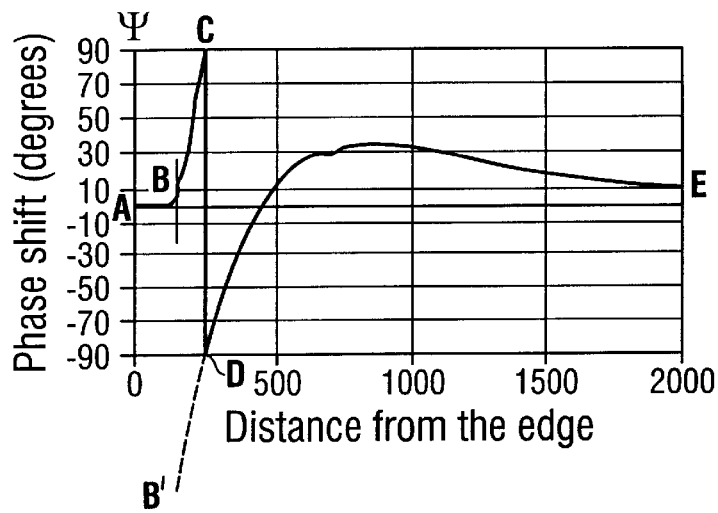
FIG. 14 shows the curve of variation of the phase shift as a function of the position on the zone to be measured in the window, the curve being obtained with the device in FIG. 13.

In a particular illustrative embodiment in which the modulator works with an oscillation amplitude equal to $\pi$, in which the window is a laminated windscreen having a thickness of 4.8 mm and in which it is illuminated with light having a wavelength of $\lambda=675$ nm, the profile represented in FIG. 14 is obtained. This profile gives the phase shift $\Psi$ as a function of the distance from the edge to the point where the measurement is taken, the distance unit being arbitrary. $\Psi$ is calculated by formula (2) given above.

Figure 12:
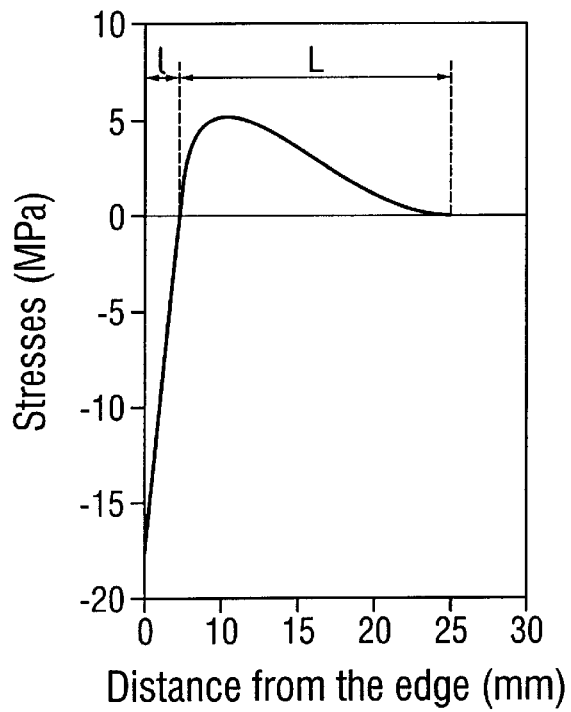
FIG. 12 shows the theoretical curve of variation of the stress in the peripheral zone of a window covered with an opaque layer as a function of the distance from the edge of the window.

First it should be noted that this profile has the same shape has the theoretical profile represented in FIG. 12. The phase discontinuities observed at the start of the profile are due to the fact that the arctangent function has its values lying between $-90°$ and $+90°$. Since the value of the phase offset is more than $90°$, the result has an offset by a period of $180°$ in the arctangent.

Figure 15:
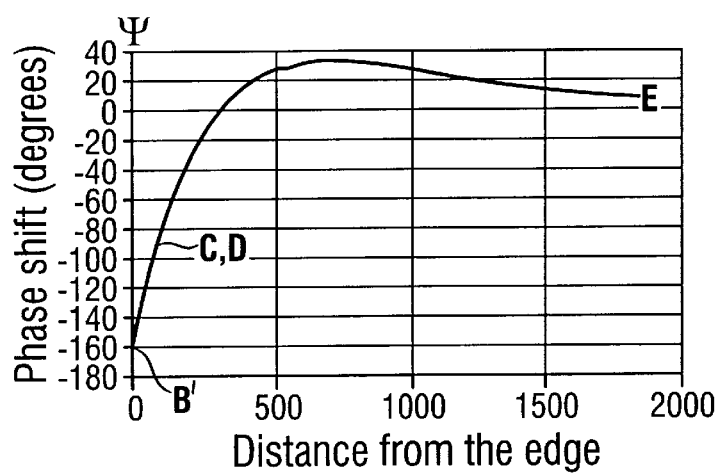
FIG. 15 represents the same curve, but corrected to eliminate the phase-shift discontinuity.

In order to correct this fault, the procedure adopted is as follows:
 the three segments AB, BC and DE of the curve are cut out,
 the horizontal segment AB, which corresponds to measurements taken in air, in front of the edge of the sample, and therefore without interest, is removed,
 the segment BC is subjected to a downward vertical translation of amplitude $90°$ so as to make point C coincide with point D. The segment B'D is thus obtained,
 the curve B'DE obtained in this way is subjected to a leftward horizontal translation so as to bring the point B' to the ordinate axis. The curve in FIG. 15 is then obtained.

Figure 16:
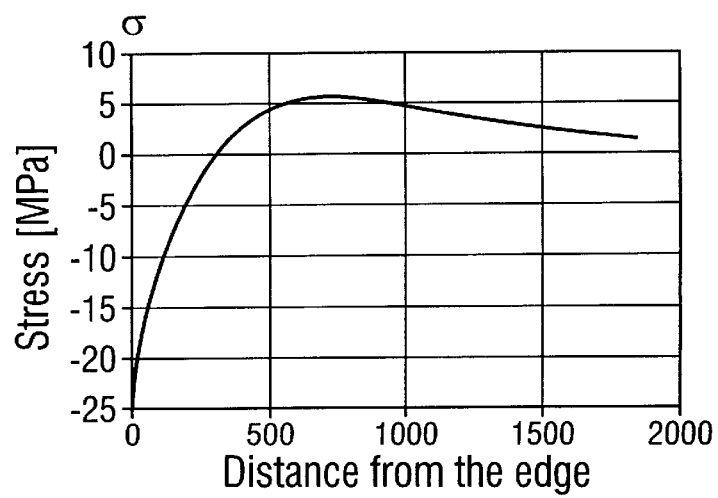
FIG. 16 represents the stress profile derived from the curve in FIG. 15.

The conversion of the phase shift into stress values is then carried out, which gives the curve in FIG. 16.

The maximum values of the phase shift and the tensile stress are read from curves 15 and 16. They are respectively $34°$ and 5.1 MPa. The minimum values of the phase shift and the compressive stress are respectively $-160°$ and $-24.0$ MPa.

FIG. 17 represents the device for measurement by reflection in FIG. 6 when applied to the measurement of stresses in a window covered on one face with an opaque layer 41. It will be pointed out only that the emitting device and the receiving device are both on the same side of the window, namely on the opposite side from the face which is covered by the opaque layer.

This device was used to measure the phase shift $\Psi$ in the window sample described above, and the curve in FIG. 18 was obtained. It can be seen that this curve has a greater number of phase discontinuities than in the case of FIG. 14, since the sensitivity of the measurement is multiplied by two in this embodiment.

Figure 20:
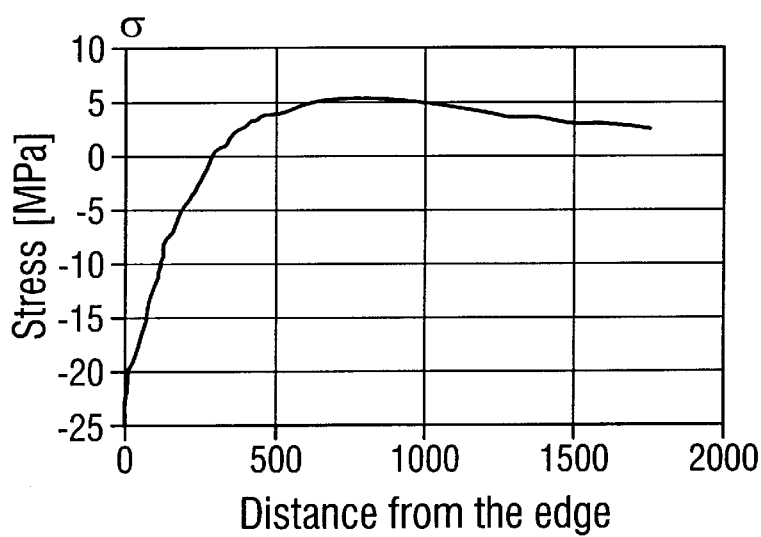
FIG. 20 represents the stress profile derived from the curve in FIG. 19.

Using the cutting method explained above, FIG. 19 is constructed and, on the basis of it, the stress profile represented in FIG. 20 is derived.

In FIG. 19, $70°$ is read for the maximum phase shift in tension and $-330°$ for the minimum phase shift in compression. These values correspond respectively to 5.2 MPa in tension and $-24.8$ MPa in compression.

It may be noted that the values of the stresses found in the case of reflection are virtually equal to those found by transmission.

It may also be noted that these values also agree with those found with the Sharples instrument. Specifically, during an experiment in which the sample is illuminated with a wavelength of 523 nm, 5.1 MPa was found for tension and $-23.3$ MPa for compression.

Figure 21:
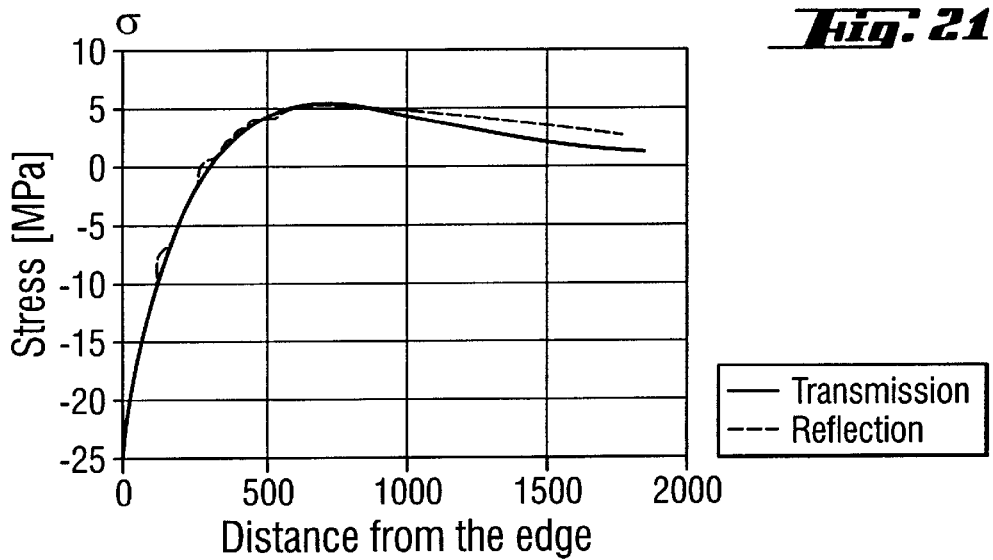
FIG. 21 shows the two curves in FIGS. 16 and 20 superimposed.

For a better view of the agreement between the measurements taken by the transmission method and the reflection method, the curves in FIGS. 16 and 20 are superimposed, as is shown in FIG. 21.

However, in spite of the agreement between the results, preference is given to the transmission layout because its sensitivity is largely sufficient. The twofold sensitivity of the reflection layout is more of a drawback because the phase discontinuities that are encountered at the start of the profile are problematic and unhelpful, and they need to be removed by numerical treatment. It can furthermore be seen that the profile in transmission is smoother than that in reflection. Lastly, interpretation of the results in reflection is difficult because the front face of the sample, which is clear and often dirty, produces a great deal of scattered light, which is stray light in relation to the light scattered by the opaque layer, which is the only light useful for the measurement.

Figure 22:
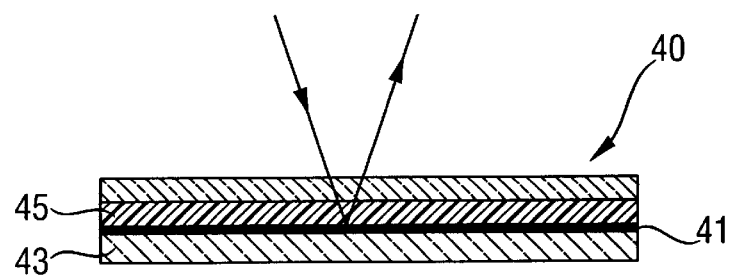
FIG. 22 shows an alternative embodiment of a window to which the method of the invention can be applied, the window being laminated and comprising an opaque layer contained between two of its constituent layers.

It was assumed above that the opaque layer covers an outer face of the window, but the invention also applies to the window in FIG. 22 in which the opaque layer 41 is contained between two neighbouring layers of the window, for example between a pane of glass 43 and an adhesive intermediate layer made of plastic 45.

What is claimed is:

1. Method for measuring membranes on a transparent material comprising the steps of:
   emitting a polarized monochromatic light beam with a light-emitting device to which an oscillating movement is imparted in order to scan the transparent material;
   passing the said light beam through a light beam modulator having reference frequencies $f_0$ and $2f_0$
   passing the modulated light beam which emerges from the modulator through the transparent material,
   receiving the light which is passed through the transparent material in a light-receiving device which has an analyzer capable of determining the modifications introduced by the birefringence of the transparent material because of the stresses which it contains,
   converting the received light beam into a corresponding electrical signal,
   detecting the frequency components B ($f_0$) and B ($2f_0$) of the electrical signal which correspond to the said reference frequencies of the modulator,
   calculating, on the basis of the said frequency components, the phase shift $\Psi$ of the collected electrical signal, when stresses are being exerted on the material, in relation to the case in which the material is not subjected to stresses, by the formula $$\psi = \text{Arctan} \frac{J_2(A_0)B(f_0)}{J_1(A_0)B(2f_0)} \quad (1)$$

where $J_1$ and $J_2$ are first order and second order Bessel functions, and $A_0$ is the phase-shift modulation amplitude of the modulator,
   and calculating the stress $\sigma$ by the formula $$\sigma = \frac{\lambda}{2\pi C_0 E} \Psi$$

where $\lambda$ wavelength of the light,
   E is the thickness of the window,
   $C_0$ is the photoelasticity constant of the material.

2. Method according to claim 1, characterized in that the light which has passed through the transparent material is reflected using a scattering and/or reflecting strip arranged on the other side of the transparent material in relation to the light-emitting device, and in that the light-receiving device is placed on the same side as the light-emitting device in order to receive the said reflected light.

3. Method according to claim 2, characterized in that the transparent material is scanned by a to-and-fro movement of the monochromatic light beam in relation to the transparent material, and in that the material itself has a relative movement imparted to it in a direction substantially perpendicular to the said to-and-fro movement.

4. Method according to claim 2, characterized in that the light emitter and the light-receiving device are made integral with one another.

5. Method according to claim 4, characterized in that the scanning is carried out from a fixed point, the emitting device and the receiving device having oscillating movements about this point imparted to them.

6. Method according to claim 1, characterized in the light which has passed through the transparent material is passed through a scattering and/or reflecting strip arranged on the other side of the transparent material in relation to the light-emitting device, and in that the receiving device is placed on the other side of the transparent material in relation to the scattering and/or reflecting strip so as to receive the light which has passed through the said strip.

7. Method according to claim 1, characterized in that said method is applied to the measurement of stresses in a strip of glass.

8. Method according to claim 7 where said glass is a strip of float glass on a production line.

9. Method according to claim 1, characterized in that said method is applied to the measurement of stresses in a transparent object coated with a substantially opaque layer on one of its faces.

10. Method according to claim 9, characterized in that the beam which emerges from the light-emitting device enters the transparent material through the face opposite the face coated with the opaque layer, and in that it is the light scattered by the opaque layer itself which is received by a receiving device which lies on the opposite side from the said opaque layer.

11. Method according to claim 9, characterized in that the beam which emerges from the emitting device enters the transparent material through the face opposite the face coated with the opaque layer, and in that it is the light scattered by the opaque layer itself which is received by a receiving device which lies on the same side as said opaque layer.

12. Method according to any one of claims 9 to 11, characterized in that said method is applied to convex windows, and in that the formula giving the stress a as a function of the phase shift $\Psi$ is corrected as a function of angle of incidence and thickness.

13. Method according to claim 9 where said opaque layer consists of a coloured enamel.

14. Method according to claim 1 where said light beam is passed through a photoelastic modulator.

15. Apparatus for implementing the method according to claim 1, characterized in that said apparatus comprises:
   a light-emitting device including a light source which emits a monochromatic light beam, a polarizer and a photoelastic modulator giving reference frequencies $f_0$ and $2f_0$,
   means for producing relative motion of the light beam in relation to the transparent material,
   a light-receiving device for receiving the light after it has passed through the transparent material, comprising an analyzer, a photodiode, two synchronous-detection amplifiers having as reference the two frequencies given by the modulator, and a computer for calculating the phase shift $\Psi$ and the stress $\sigma$.

16. Apparatus according to claim 15, characterized in that said apparatus also has a scattering and/or reflecting strip (60) lying on the opposite side of the transparent material (40) from the light-emitting device, and in that the latter is integral with the light-receiving device.

17. Apparatus according to claim 16, characterized in that the light-emitting device and the light-receiving device are moved in an oscillating movement.

18. Apparatus according to claim 15, characterized in that the light-emitting device and the light-receiving device lie on either side of the transparent material (40), and in that the latter is covered with a substantially opaque layer (41) lying on the same side as the receiving device.

19. Apparatus according to claim 18, characterized in that a converging optical lens (51) is provided for converging the beam output by the analyzer (48) onto the photodiode (50).

20. Apparatus according to claim 19, characterized in that the transparent material is a laminated widow, and in that the opaque layer (41) is contained between two neighboring layers (43, 45) of the window.

* * * * *

UNITED STATES PATENT AND TRADEMARK OFFICE
CERTIFICATE OF CORRECTION

| | | |
|---|---|---|
| PATENT NO. | : 6,219,131 B1 | Page 1 of 1 |
| DATED | : April 17, 2001 | |
| INVENTOR(S) | : Jingwei Zhange and Pascal Grente | |

It is certified that error appears in the above-identified patent and that said Letters Patent is hereby corrected as shown below:

Claim 12,
Line 3, change the first occurrence of "a" to -- α --.

Signed and Sealed this

Twenty-fifth Day of September, 2001

Attest:

*Nicholas P. Godici*

Attesting Officer

NICHOLAS P. GODICI
*Acting Director of the United States Patent and Trademark Office*